July 8, 1969     F. SCHLEGEL     3,454,326
HIGH APERTURE OBJECTIVE LENS SYSTEM FOR TELEVISION CAMERAS
Filed Jan. 17, 1968
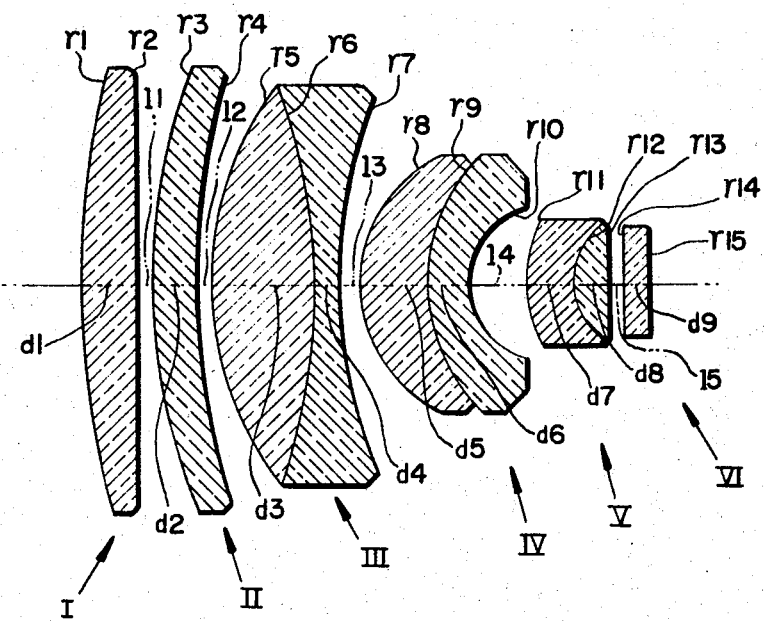
INVENTOR.
FRANZ SCHLEGEL
BY Row and Berman
AGENTS

United States Patent Office 3,454,326
Patented July 8, 1969

3,454,326
HIGH APERTURE OBJECTIVE LENS SYSTEM FOR TELEVISION CAMERAS
Franz Schlegel, Munich, Germany, assignor to Optische Werke G. Rodenstock, Munich, Germany
Filed Jan. 17, 1968, Ser. No. 698,611
Claims priority, application Germany, Mar. 25, 1967, O 12,391
Int. Cl. G02b 9/62
U.S. Cl. 350—176                  3 Claims

ABSTRACT OF THE DISCLOSURE

An objective lens system for a television camera consisting, in sequence, from the object side toward the camera tube, of two simple positive lenses, a positive, meniscus-shaped doublet having a cemented interface which is convex toward the associated television camera tube, a negative, meniscus-shaped doublet having a cemented interface which is concave toward the tube, a positive doublet having a cemented interface which is concave toward the tube, and the plano-parallel front wall of the tube, the system having an $f$-number of 0.75.

BACKGROUND OF THE INVENTION

This invention relates to objective lens systems, and particularly to a lens system derived from the known Cooke triplet type.

The several known objective lens systems of the type described do not provide an image of highest quality at an effective aperture corresponding to an $f$-number substantially smaller than 1.0 and over a field of 15° as is required in modern television cameras for producing images of remote objects in poor light.

The object of the invention is to provide a lens system in which great light-passing power is obtained without sacrificing definition.

SUMMARY OF THE INVENTION

The improved lens system of the invention consists of six air-spaced elements of which the first is a simple positive lens; the second a simple, positive, meniscus-shaped lens; the third a meniscus-shaped positive doublet having a cemented interface which is convex toward the image side of the system; the fourth a negative meniscus-shaped doublet having a cemented interface which is concave toward the image side; the fifth is a positive doublet having a cemented interface which is concave toward the image side; and the last is a plano-parallel plate which may be the front wall of the television camera tube.

Other features and additional objects of the invention will hereinafter become more fully apparent from the following description of a preferred embodiment as illustrated in the accompanying drawing.

BRIEF DESCRIPTION OF THE DRAWING

The sole figure of the drawing shows an objective lens system of the invention in conventional section on the optical axis.

DESCRIPTION OF THE PREFERRED EMBODIMENT

The lens system of a television camera shown in the drawing consists of six elements I to VI which are arranged in three air-spaced groups corresponding to the three elements of a conventional Cooke triplet, the elements of each group being closely spaced if at all.

The first element I is a plano-convex simple lens. The element II is a meniscus-shaped positive lens. The element III, which completes the first group, is a positive cemented doublet whose cemented interface is convex toward the element IV or the image side of the lens system shown in the figure.

The second group consists of a negative, meniscus-shaped doublet IV whose cemented interface is concave toward the image side. The third group consists of a cemented doublet V whose cemented interface is concave toward the image side, and of the plano-parallel front wall VI of the television camera tube, not otherwise shown.

The radii of curvature $r$, thicknesses $d$, separations $l$, indices of refraction $n_E$, and Abbé numbers $V_E$ of the nine glasses which form the six elements are listed in the attached table.

The illustrated lens system is particularly well corrected for spherical aberration, and is superior in this respect to all similar lens systems of which I am aware. This improved spherical correction is due, at least to a significant part, to the two simple, positive lenses I and II. The use of glasses having very high indices of refraction $n_E$ contributes to the almost complete elimination of residual aberration even at an $f$-number of 0.70, but a relative aperture of 1:0.75 is preferred for highest picture quality.

A plano-parallel glass on the image side of the system is essential for achieving the full advantages of this invention. If the front wall of a television camera tube does not form the plano-parallel glass, a separate plano-parallel member is added to the refractive elements. The use of a flat glass plate is thus necessary when the illustrated lens system is used as the objective of a still or motion picture camera, or as the lens system in a projector. The glass plate may serve simultaneously as a filter.

The relative aperture of the illustrated lens system is 1:0.75, and its back focus is 6.1 mm.

TABLE

| Element | Radius | Thickness Separation | Refractive Index, $n_E$ | Abbe No., $V_E$ |
|---|---|---|---|---|
| I | $r_1=+280.1$ | $d_1=16.35$ | 1.694 | 54.5 |
|   | $r_2=\infty$ | | | |
|   |   | $l_1=0.15$ | | |
| II | $r_3=+207.8$ | $d_2=15.1$ | 1.694 | 54.5 |
|   | $r_4=+247$ | | | |
|   |   | $l_2=0.63$ | | |
|   | $r_5=+99.8$ | | | |
| III | $r_6=-206$ | $d_3=29.0$ | 1.721 | 47.7 |
|   | $r_7=+161$ | $d_4=7.8$ | 1.813 | 25.2 |
|   |   | $l_3=8.7$ | | |
|   | $r_8=+44.4$ | | | |
| IV | $r_9=+51.65$ | $d_5=20.3$ | 1.694 | 54.5 |
|   | $r_{10}=+22.90$ | $d_6=14.5$ | 1.768 | 26.7 |
|   |   | $l_4=14.4$ | | |
|   | $r_{11}=+61.6$ | | | |
| V | $r_{12}=+19.90$ | $d_7=12.0$ | 1.592 | 52.7 |
|   | $r_{13}=+1547$ | $d_8=10.28$ | 1.792 | 50.2 |
|   |   | $l_5=2.5$ | | |
| VI | $r_{14}=\infty$ | $d_9=6.55$ | 1.525 | 59.2 |
|   | $r_{15}=\infty$ | | | |

What is claimed is:
1. A high-speed multi-element lens system comprising, in sequence along the optical axis of said system:
 (a) a first element I;
 (b) a second element II, said first and second elements being positive simple lenses;
 (c) a third element III, said third element being a meniscus-shaped positive doublet having a cemented interface convex in a direction away from said second element;

(d) a fourth element IV, said fourth element being a negative, meniscus-shaped doublet having a cemented interface concave in a direction away from said third element; and (e) a fifth element V, said fifth element being a positive doublet having a cemented interface concave in a direction away from said fourth element, the glasses of said elements having values of radii of surface curvature $r$, thicknesses $d$, separations $l$, refractive indices $n_E$, and Abbé numbers $V_E$ substantially as listed in the following Table, the subscripts in said table indicating the position of the corresponding values in said sequence, said values being expressed in percent of the equivalent focal length of said lens system.

TABLE

| Element | Radius | Thickness Separation | Refractive Index, $n_E$ | Abbe No., $V_E$ |
|---|---|---|---|---|
| I | $r_1 = +280.1$ | $d_1 = 16.35$ | 1.694 | 54.5 |
|   | $s_2 = \infty$ | $l_1 = 0.15$ | | |
| II | $r_3 = +207.8$ | $d_2 = 15.1$ | 1.694 | 54.5 |
|    | $r_4 = +247$ | $l_2 = 0.63$ | | |
| III | $r_5 = +99.8$ | $d_3 = 29.0$ | 1.721 | 47.7 |
|     | $r_6 = -206$ | $d_4 = 7.8$ | 1.813 | 25.2 |
|     | $r_7 = +161$ | $l_3 = 8.7$ | | |
| IV | $r_8 = +44.4$ | $d_5 = 20.3$ | 1.694 | 54.5 |
|    | $r_9 = +51.65$ | $d_6 = 14.5$ | 1.768 | 26.7 |
|    | $r_{10} = +22.90$ | $l_4 = 14.4$ | | |
| V | $r_{11} = +61.6$ | $d_7 = 12.0$ | 1.592 | 52.7 |
|   | $r_{12} = +19.90$ | $d_8 = 10.28$ | 1.792 | 50.2 |
|   | $r_{13} = +1547$ | | | |

2. A system as set forth in claim 1, further comprising a sixth, plano-parallel element VI, the separation $l_5$ of said sixth element from said fifth element V being 2.5, and said sixth element having a thickness $d_9$ of 6.55, a refractive index $n_E$ of 1.525, and an Abbé number $V_E$ of 59.2, the values of said separation $l_5$ and said thickness $d_9$ being expressed in percent of said equivalent focal length.

3. A system as set forth in claim 2, having a relative aperture of approximately 1:0.75.

References Cited

UNITED STATES PATENTS 3,300,267   1/1967   Pennig _____ 350—223

FOREIGN PATENTS 1,187,033   2/1965   Germany.
1,247,684   8/1967   Germany.

DAVID SCHONBERG, Primary Examiner.

RONALD J. STERN, Assistant Examiner.

U.S. Cl. X.R.

178—7.85, 7.92; 350—204, 215